(12) United States Patent
Dadheech et al.

(10) Patent No.: US 8,148,035 B2
(45) Date of Patent: Apr. 3, 2012

(54) BIPOLAR PLATE COATING ARCHITECTURE FOR FUEL CELLS AND METHODS OF MAKING AND USING THE SAME

(75) Inventors: Gayatri Vyas Dadheech, Rochester Hills, MI (US); Youssef M. Mikhail, Sterling Heights, MI (US); Mahmoud H. Abd Elhamid, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 846 days.

(21) Appl. No.: 12/122,162

(22) Filed: May 16, 2008

(65) Prior Publication Data

US 2009/0286118 A1   Nov. 19, 2009

(51) Int. Cl.
*H01M 4/64* (2006.01)
*H01M 2/38* (2006.01)
*H01M 2/40* (2006.01)
*H01M 8/24* (2006.01)
*H01M 5/12* (2006.01)

(52) U.S. Cl. ........ 429/535; 429/518; 429/519; 429/457; 427/115

(58) Field of Classification Search .................. 429/457, 429/518, 519, 535; 427/115
See application file for complete search history.

(56) References Cited

U.S. PATENT DOCUMENTS

| | | | |
|---|---|---|---|
| 5,776,624 A | 7/1998 | Neutzler | |
| 5,942,348 A | 8/1999 | Jansing et al. | |
| 6,649,031 B1 | 11/2003 | Iqbal et al. | |
| 6,852,438 B2 * | 2/2005 | Gao et al. | 429/518 |
| 6,866,958 B2 | 3/2005 | Vyas et al. | |
| 2006/0093735 A1 * | 5/2006 | Cheng et al. | 427/115 |
| 2006/0105222 A1 * | 5/2006 | Abd Elhamid et al. | 429/38 |
| 2008/0038619 A1 * | 2/2008 | Takagi et al. | 429/34 |

FOREIGN PATENT DOCUMENTS

| | | |
|---|---|---|
| CN | 101057350 A | 10/2007 |
| CN | 101123313 A | 2/2008 |

* cited by examiner

*Primary Examiner* — Patrick Joseph Ryan
*Assistant Examiner* — Julian Anthony
(74) *Attorney, Agent, or Firm* — BrooksGroup

(57) ABSTRACT

One exemplary embodiment of the invention includes a method including providing a bipolar plate for a fuel cell having a reactant gas flow field defined therein by a plurality of lands and at least one channel, and depositing a low contact resistant material selectively over portions of the lands leaving portions of the lands uncovered by the low contact resistant material.

25 Claims, 7 Drawing Sheets

BIPOLAR PLATE COATING ARCHITECTURE FOR FUEL CELLS AND METHODS OF MAKING AND USING THE SAME

TECHNICAL FIELD

The field to which the disclosure generally relates includes bipolar plates for fuel cells and methods of making and using the same.

BACKGROUND

Heretofore, bipolar plates for fuel cells have been known to include at least one reactant gas flow path defined in a surface of the bipolar plate by a plurality of lands and at least one channel. To reduce contact resistance between a diffusion media layer and the bipolar plate, the bipolar plate has heretofore been coated with gold.

SUMMARY OF EXEMPLARY EMBODIMENTS OF THE INVENTION

One exemplary embodiment of the invention includes a product including a bipolar plate including a plurality of lands and at least one channel defining a reactant gas flow path, a low contact resistance coating selectively deposited over a plurality of first locations on the lands, and so that a plurality of second locations on the lands are free of the low contact resistance coating. In one exemplary embodiment, the low contact resistance coating may include gold.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 10 illustrates a method of depositing a low contact resistant coating over the hydrophilic coating and over the lands and channels of a bipolar plate according to one exemplary embodiment of the invention.

FIG. 11 illustrates a method including depositing a hydrophilic coating over the lands and channel of a bipolar plate and thereafter depositing a low contact resistant coating over only the land portions of the bipolar plate according to one exemplary embodiment of the invention.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1:
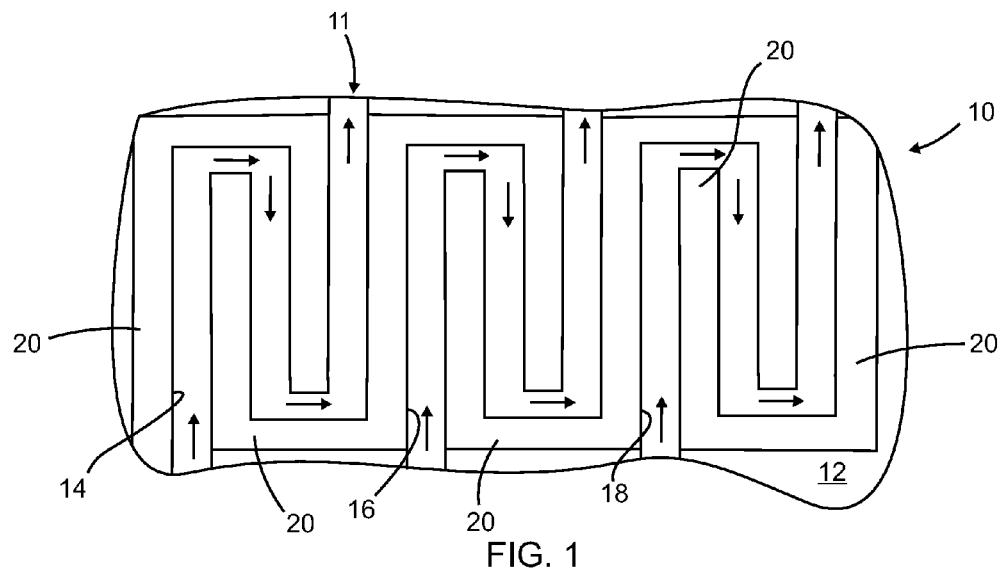
FIG. 1 illustrates a bipolar plate including a reactant gas flow field defined therein for use in a method according to one exemplary embodiment of the invention.

Referring now to FIG. 1, one exemplary embodiment of the invention may include a method including providing a bipolar plate 10 for use in a fuel cell. The bipolar plate 10 may include a reactant gas flow field 11 defined therein. The bipolar plate may include a first face 12 and one or more reactant gas flow channels 14, 16, 18 defined in the first face 12 at least in part by a plurality of lands 20. The arrows in FIG. 1 indicate the direction in one embodiment, that a reactant gas may flow through one of the channels 14, 16, 18.

Figure 2:
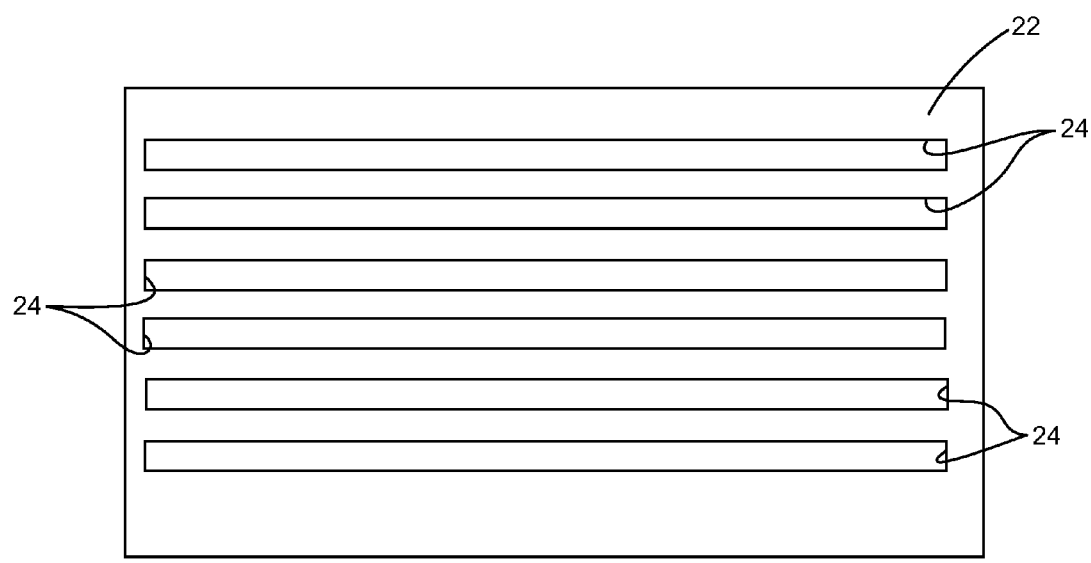
FIG. 2 illustrates a mask including a plurality of openings defined therein for placement over the bipolar plate illustrated in FIG. 1 according to one exemplary embodiment of the invention.

Referring now to FIG. 2, a mask may be provided, including a plurality of openings 24 defined therein. As shown in FIG. 2, in one exemplary embodiment the openings 24 may be in the form of elongated slots which may span the area of the lands 20 defining the reactant gas flow path 11 in the bipolar plate 10.

Figure 3:
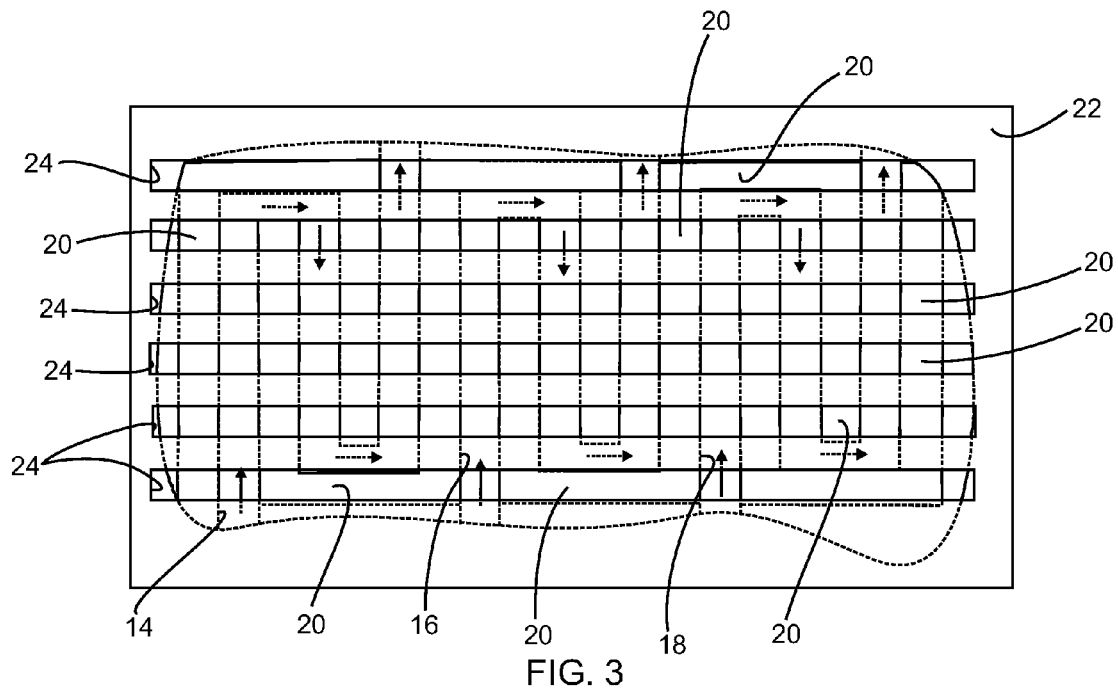
FIG. 3 illustrates a method according to one exemplary embodiment of the invention wherein the mask is placed over the bipolar plate so that the openings in the mask overlie portions of lands and channels on the bipolar plate.
Figure 4:
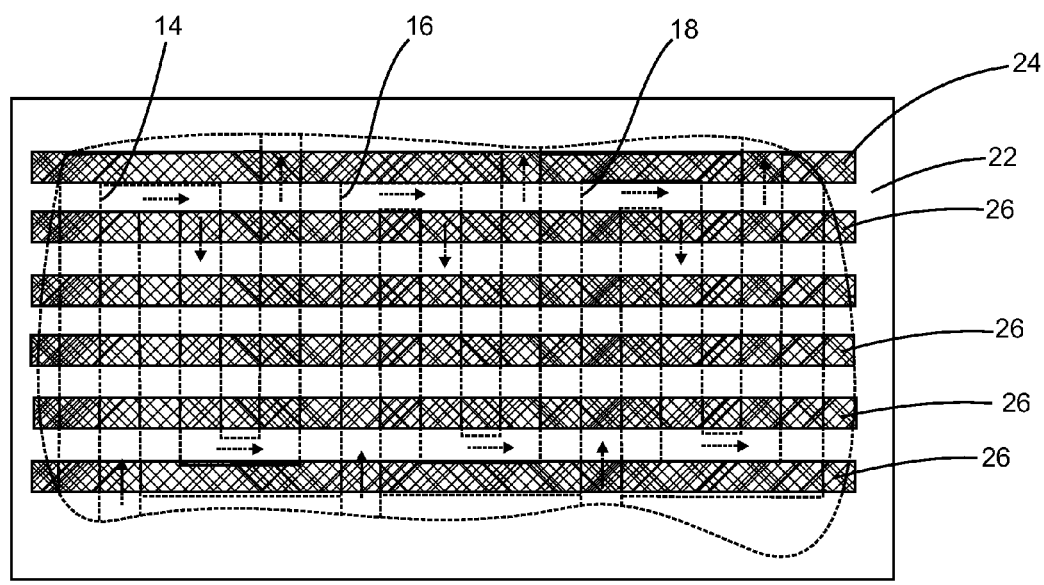
FIG. 4 illustrates a method according to one exemplary embodiment of the invention including depositing a low contact resistance coating through the openings in the mask of FIG. 3.

As shown in FIG. 3, in one exemplary embodiment, the mask 22 may be provided over the bipolar plate so that the elongated slot openings 24 span a plurality of lands 20 and at least one of the channels 14, 16 or 18. As shown in FIG. 4, a low contact resistance material or coating such as, but not limited to, gold, palladium, platinum, iridium, ruthenium, or mixtures thereof may be deposited through the openings 24 in the mask 22 and onto a plurality of portions of the lands and into portions of the channels 14, 16 or 18. Using the mask 22 shown in FIG. 4, the low contact resistance material 26 is deposited at a plurality of locations on the lands and a plurality of locations on the channels. A plurality of locations on the lands and a plurality of locations on the channels are left uncovered by the low contact resistance material 26. As such, the cost of manufacturing a bipolar plate with a low contact resistance coating thereon may be drastically reduced because much less of the low contact resistance material 26 is deposited on the bipolar plate 10 in comparison to the prior art method which covered the entire face of the bipolar plate. Despite the fact that the lands 20 are not completely covered by the low contact resistance material 26, no significant change in fuel cell performance was observed. Furthermore, in another exemplary embodiment, the low contact resistance material or coating may be deposited only overlying the active area of the fuel cell (the area directly underlying or overlying the anode or cathode catalyst) to further reduce the amount of the low contact resistance material needed to be applied to the bipolar plate 10.

With respect to the mask shown in FIGS. 3-4, although the openings 24 appear to be aligned in a perpendicular direction to the lands 20, the method may include depositing strips of low contact resistance material 26 in a direction that is not generally perpendicular to the longitudinal direction of the lands and may be skewed therefrom.

Figure 5:
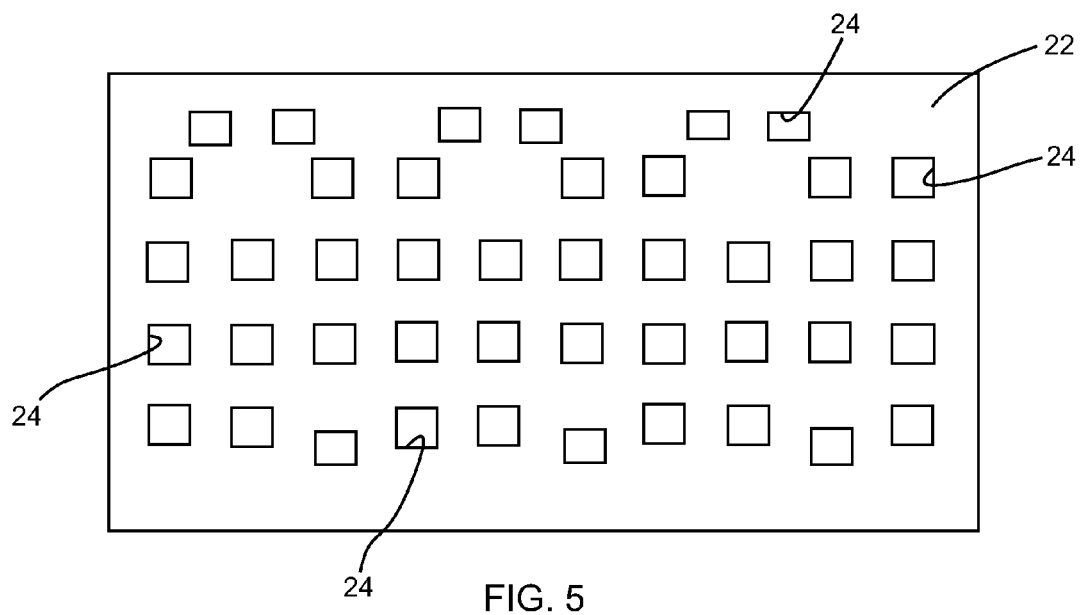
FIG. 5 illustrates an alternative exemplary embodiment of a mask including discrete openings patterned after the location of lands in a bipolar plate for use in a method according to one exemplary embodiment of the invention.

Referring now to FIG. 5, in another exemplary embodiment of the invention, an alternative mask 22 may be provided, including discrete openings 24 defined therein and arranged to be aligned with only the lands 20 of the bipolar plate 10 and not the channels 14, 16 or 18.

Figure 6:
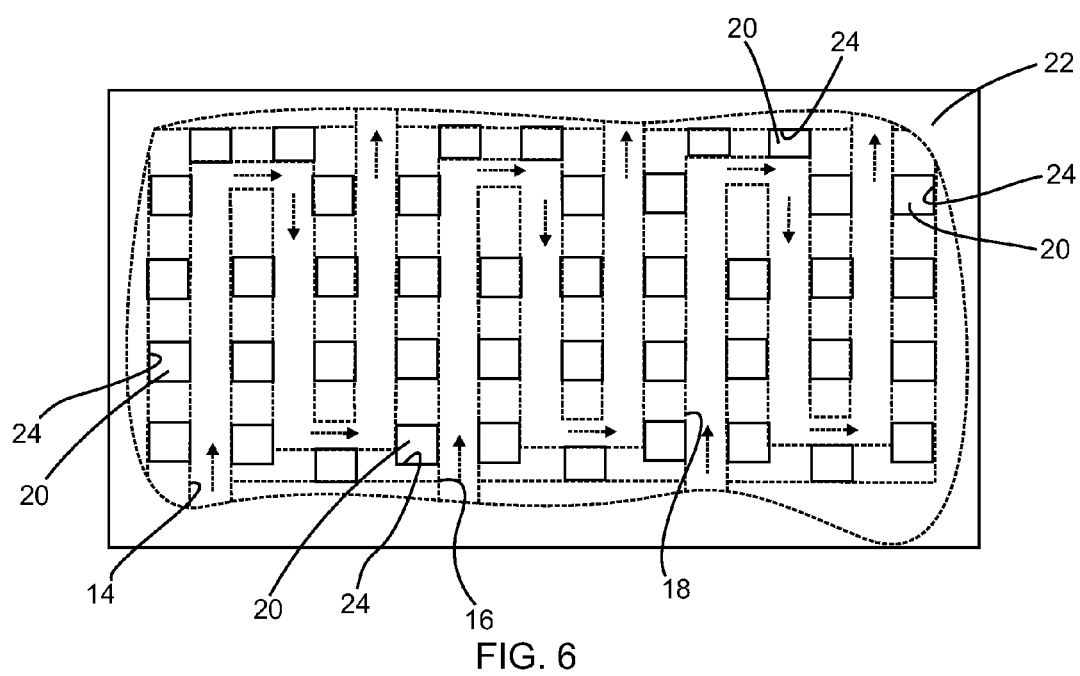
FIG. 6 illustrates a method according to one exemplary embodiment of the invention wherein the mask having discrete openings is placed over the bipolar plate so that the discrete openings are aligned with the lands on the bipolar plate.

Referring now to FIG. 6, the mask 22 of FIG. 5 may be placed over the bipolar plate 10 so that the discrete openings 24 align with the lands 20 of the bipolar plate, and not with the channels 14, 16 or 18.

Figure 7:
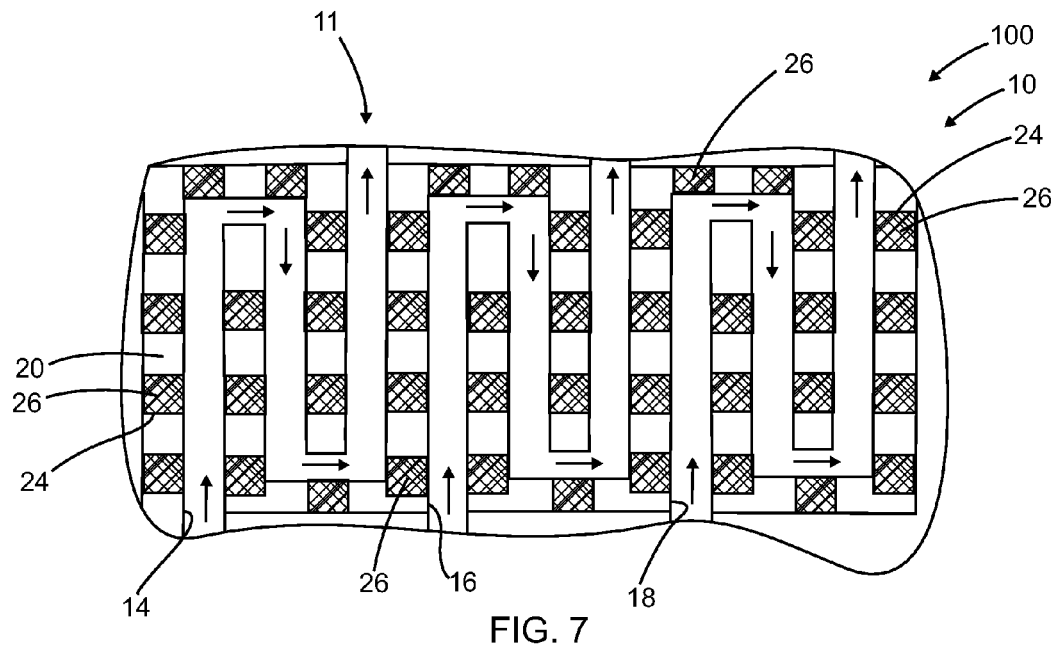
FIG. 7 illustrates a method according to one exemplary embodiment of the invention including depositing a low contact resistance material through the openings in the mask and onto a plurality of spaced apart locations on the lands of the bipolar plate.

Referring now to FIG. 7, a low contact resistance material 26 may be deposited through the discrete openings 24 and onto the lands 20, so that substantially none of the low contact resistance material is deposited into the channels 14, 16 or 20. Depositing the low contact resistance material 26 only on the land portions, leaving portions of the land uncoated, drastically reduces the amount of the low contact resistance material needed on the bipolar plate.

Figure 8:
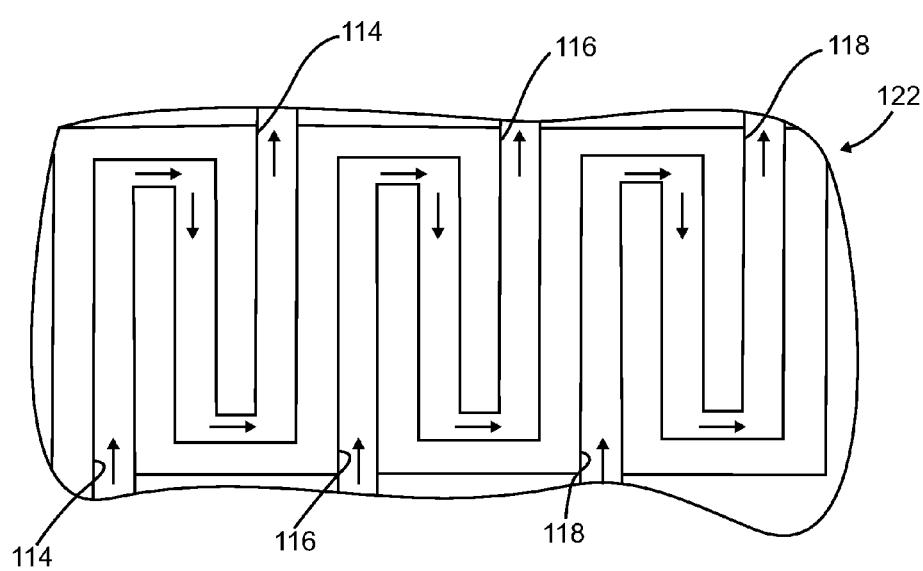

Referring now to FIG. 8, in another exemplary embodiment of the invention, an alternative mask 122 may be provided and includes a plurality of openings 114, 116, 118 formed therein and constructed and arranged to be aligned with the channels 14, 16 and 18 of the bipolar plate. The mask 122 may be placed over the bipolar plate and a hydrophilic coating may be deposited through the openings 114, 116 and 118 so that the hydrophilic coating is deposited substantially only in the channels 14, 16 or 18 of the bipolar plate and not onto the lands 20. The hydrophilic coating deposited only in the channels 14, 16 or 18 may improve water management of a fuel cell stack, reducing the likelihood of water droplets blocking reactant gas flow through the channels 14, 16 or 18 formed in the bipolar plate 10.

Figure 9:
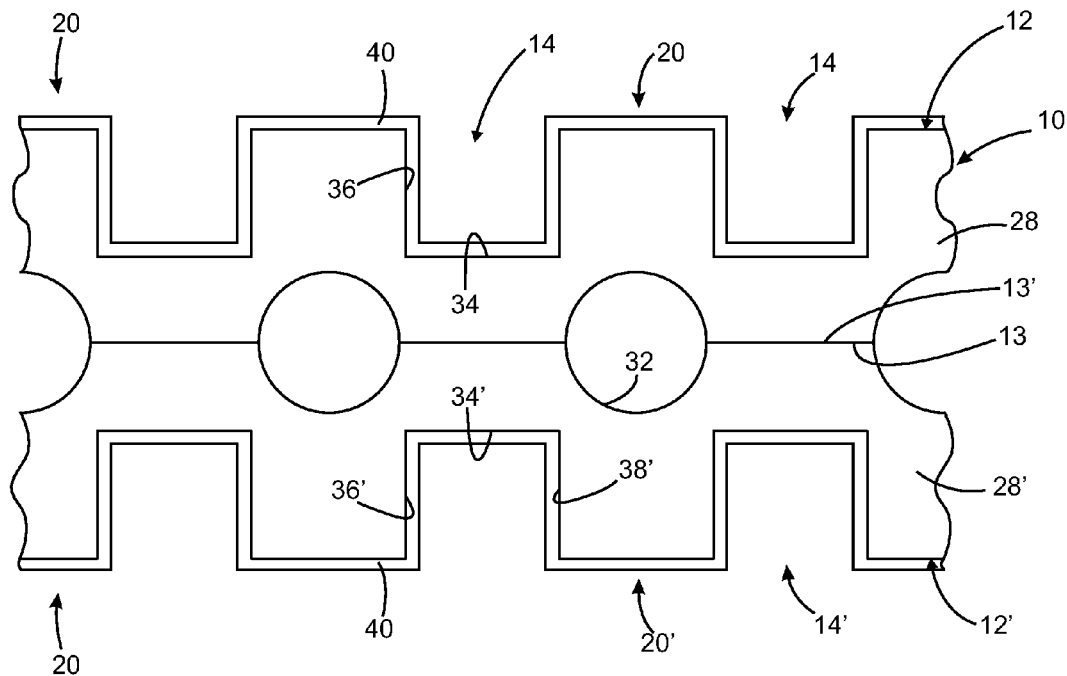
Figure 10:
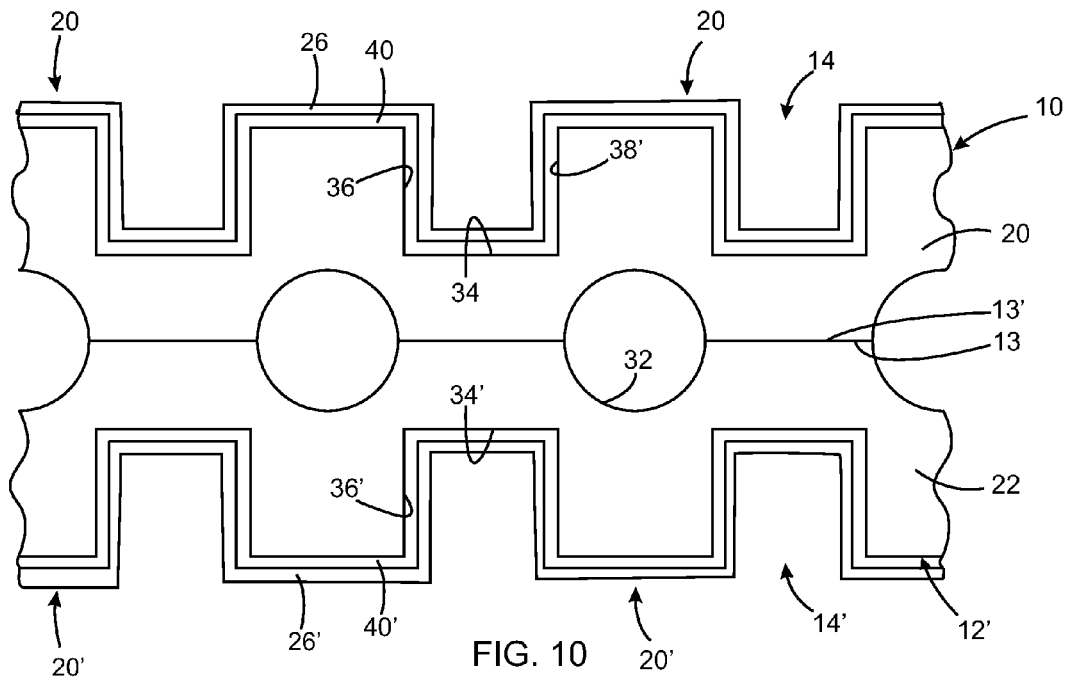
FIG. 10 illustrates a method of depositing a low contact coating over the hydrophilic coating and over the lands and channels of a bipolar plate according to one exemplary embodiment of the invention.

Referring now to FIG. 9, according to one exemplary embodiment of the invention, a first coating 40 which may be a hydrophilic material may be deposited over surfaces 12, 12' including the lands 20, 20' and channels 14, 14'. The channel portions 14, 14' may be defined by a lower wall or floor 34 and at least a first side wall 36 and optionally a second side wall 38, 38' respectively. As shown in FIG. 10, thereafter, the low contact resistance material 26 may be selectively deposited over portions of the lands 20, 20' and channels 14, 14', leaving portions of the lands 20, 20' and channels 14, 14' uncoated by the low contact resistance material.

Figure 11:
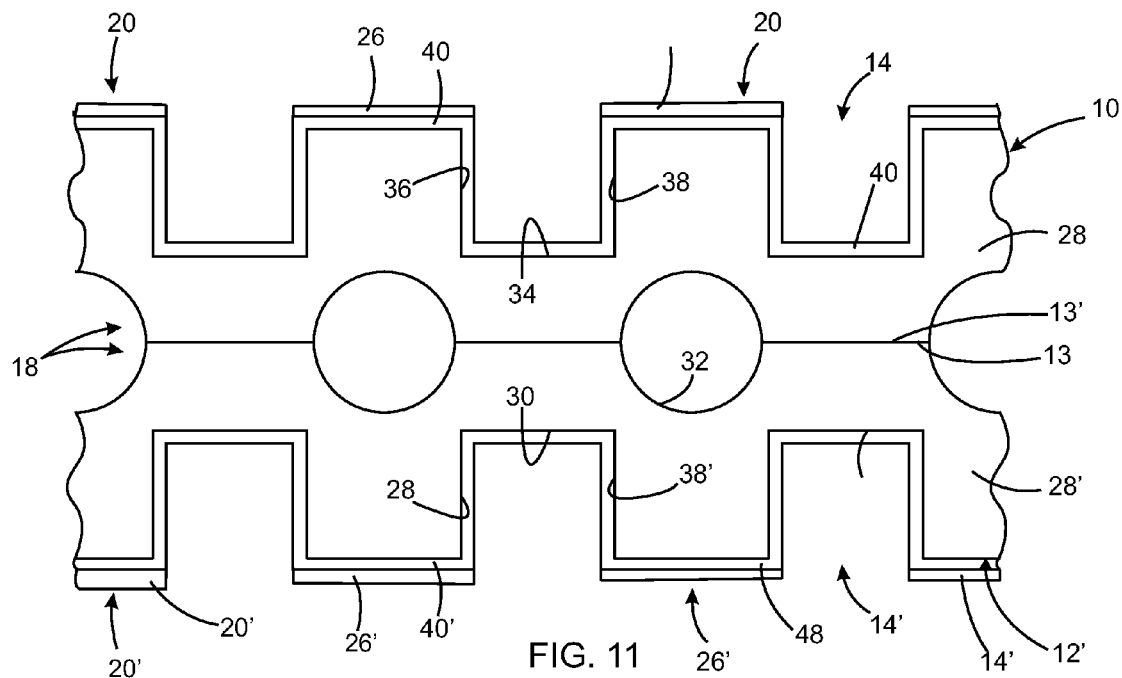
FIG. 11 illustrates a method including depositing a hydrophilic coating over the lands and channel of a bipolar plate and thereafter depositing a low contact resistance coating over only the land portions of the bipolar plate according to one exemplary embodiment of the invention.

Referring now to FIG. 11, in another exemplary embodiment of the invention, the first coating 40 may be deposited over the lands 20, 20' and channels 14, 14' of the bipolar plate and thereafter the low contact resistance material 26, 26' may be deposited substantially only over the lands 20, 20' without depositing any significant amount of the low contact resistance material 26 in the channels 14, 14'.

Figure 12:
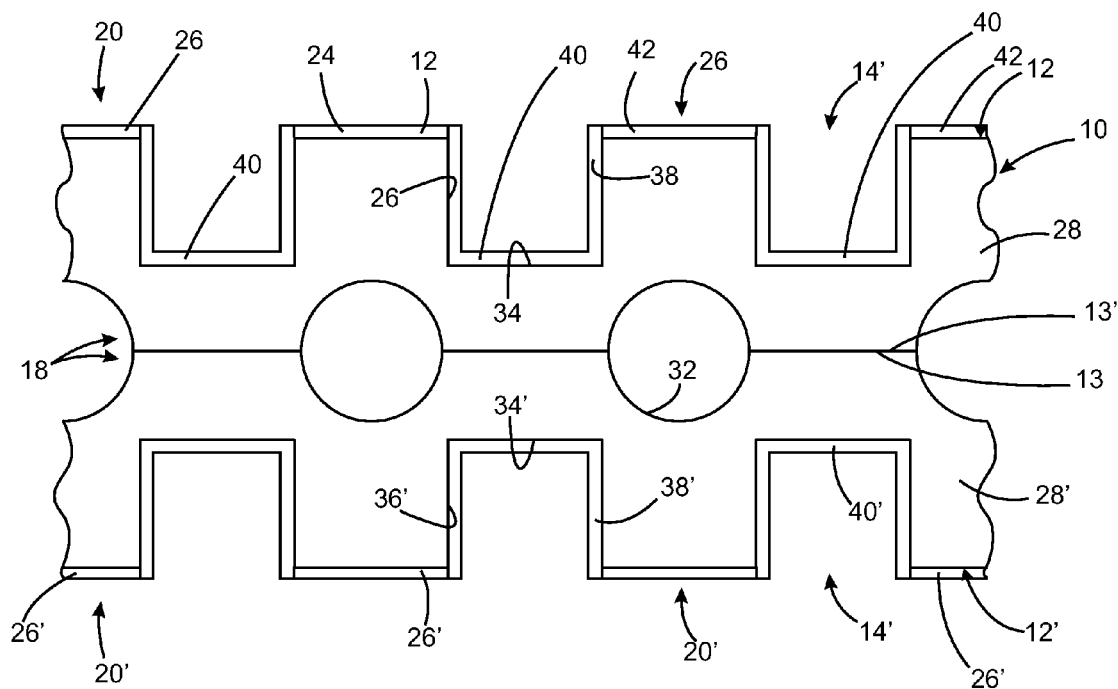
FIG. 12 illustrates a method of depositing a hydrophilic coating over the channel portion of a bipolar plate and depositing a low contact resistance coating over the land portion and not into the channel portion according to one exemplary embodiment of the invention.

Referring now to FIG. 12, in another exemplary embodiment of the invention, the first coating 40, which may be a hydrophilic coating, may be deposited only in the channels 14, 14' and the low contact resistance material 26, 26' may be deposited substantially only over the lands 20, 20' and so that substantially no contact resistance material 26 is deposited in the channels 14, 14'. In one exemplary embodiment, substantially no hydrophilic coating is deposited over the lands 20, 20'.

Figure 13:
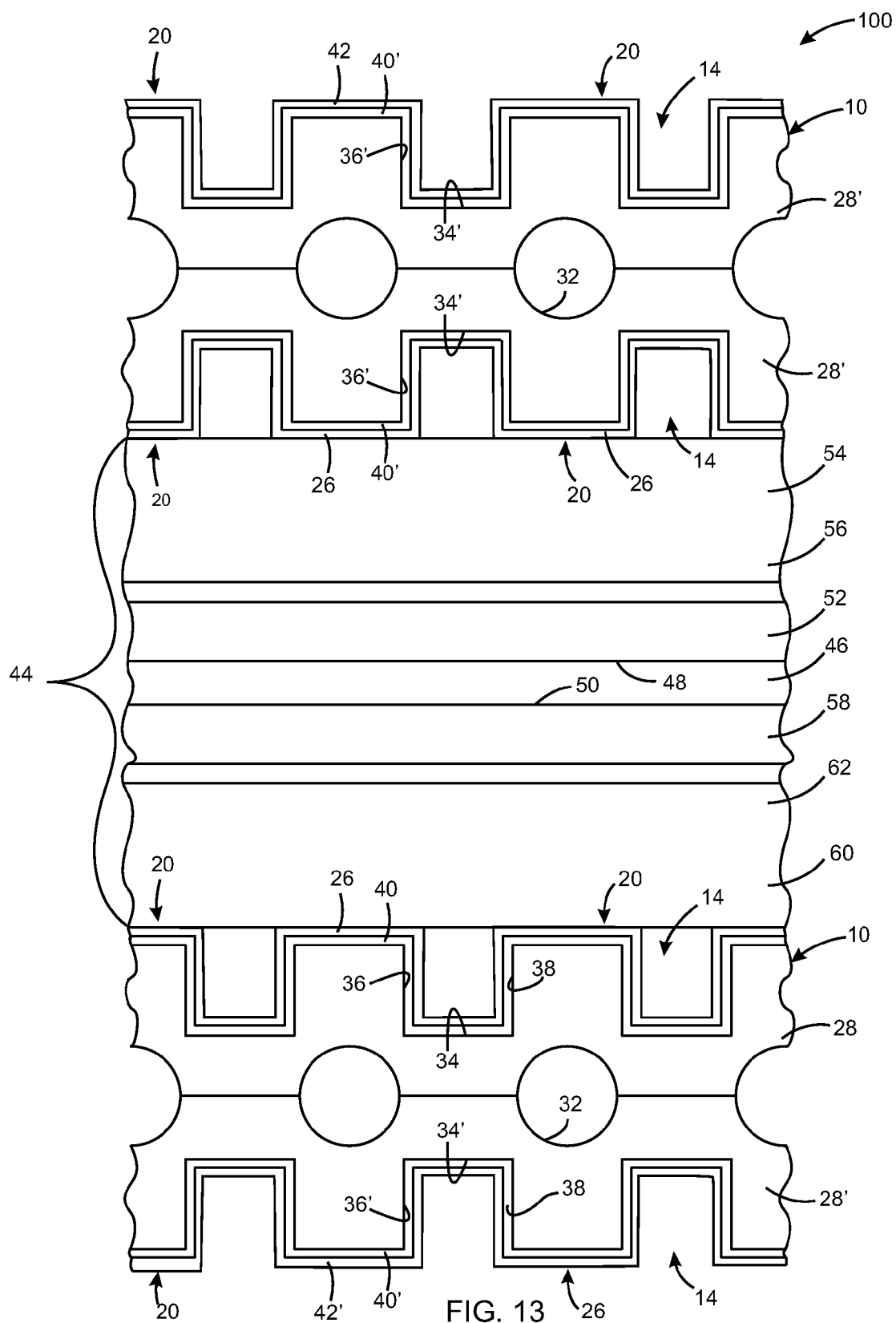
FIG. 13 illustrates a portion of a fuel cell stack including a plurality of bipolar plates including a low contact resistance coating deposited over a plurality of locations on the bipolar plate including a plurality of locations on the lands, leaving a plurality of locations on the lands uncoated by the low contact resistance coating according to one exemplary embodiment of the invention.

Referring now to FIG. 13, one exemplary embodiment of the invention includes a product 10 such as a fuel cell stack including a plurality of bipolar plates 10 having a low contact resistance material 26 selectively deposited over portions of lands 20, 20', leaving portions of the lands 20, 20' uncovered by the low contact resistance material 26. The fuel cell stack may include a soft goods portion 44 which may include a membrane 46 having a first face 48 and a second face 50, a cathode electrode 52 may be deposited over the first face 48 of the membrane 46 and an anode electrode 58 may be deposited over the second face 50 of the membrane 46. An anode side gas diffusion media layer which may have a microporous layer 56 thereon may be interposed between the anode catalyst layer 52 and the bipolar plate 10. The low contact resistance material 26 over the lands 20, 20' of the bipolar plate 10 contact the anode side gas diffusion media layer 54. Similarly, a cathode side gas diffusion media layer 60 having a microporous layer 62 thereon may be interposed between the cathode catalyst layer 58 and a second bipolar plate 10 so that the low contact resistance coating 26 on the lands 20 contacts the cathode side gas diffusion media layer 60. The bipolar plate 10 may be made from a first substrate 28 and a second substrate 28' which may be welded together to define coolant flow channels 32 for flowing cooling fluid through the center of the bipolar plate 10 to cool the same.

The above description of embodiments of the invention is merely exemplary in nature and, thus, variations thereof are not to be regarded as a departure from the spirit and scope of the invention.

What is claimed is:

1. A method comprising:
providing a bipolar plate for a fuel cell including a reactant gas flow field defined therein by a plurality of lands and at least one channel comprising at least two adjacent channel segments, the two adjacent channel segments each being defined at least by a floor and one sidewall or two sidewalls extending upward from the floor to an upper surface of a land extending between the sidewalls of the two adjacent channel segments, and selectively depositing a low contact resistance material over select portions of the upper surface of the land, leaving a plurality of portions of the upper surface of the land uncovered by the low contact resistance material wherein the selectively depositing comprises placing a mask including a plurality of openings over the bipolar plate and depositing the low contact resistance material through the openings in the mask wherein the openings are discrete openings each being aligned substantially only with a land.

2. A method as set forth in the claim 1 wherein the selectively depositing is conducted so that select portions of the at least one channel is covered with the low contact resistance material leaving portions of the at least one channel uncovered by the low contact resistance material.

3. A method as set forth in claim 1 wherein the openings in the mask are in the form of elongated slots.

4. A method as set forth in claim 3 wherein the elongated slots run generally in a perpendicular direction to the lands.

5. A method as set forth in claim 3 wherein the elongated slots run in a skewed direction with respect with the longitudinal direction of the lands.

6. A method as set forth in claim 3 wherein the elongated slots span the plurality of lands and at least one channel.

7. A method as set forth in claim 6 further comprising selectively depositing a low contact resistance material over select portions of the at least one channel leaving portions of the at least one channel uncovered by the low contact resistance material.

8. A method as set forth in claim 1 wherein the selectively depositing is conducted so that substantially no low contact resistance material is deposited in the at least one channel.

9. A method as set forth in claim 1 wherein the low contact resistance material comprises gold.

10. A method as set forth in claim 1 further comprising depositing a hydrophilic coating into the at least one channel.

11. A method as set forth in claim 10 wherein the depositing the hydrophilic coating is conducted prior to the selectively depositing a low contact resistance material.

12. A method as set forth in claim 11 wherein the low contact resistance material is deposited over the hydrophilic coating.

13. A method as set forth in claim 10 wherein the hydrophilic coating is deposited over substantially the entire face of the bipolar plate.

14. A method as set forth in claim 10 wherein the hydrophilic coating is deposited substantially only in the at least one channel.

15. A method as set forth in claim 10 wherein the low contact resistance material is deposited substantially only on the lands, and the hydrophilic coating is deposited substantially only in the at least one channel.

16. A product comprising:
a bipolar plate for a fuel cell including a coolant gas flow field defined therein by a plurality of lands and at least one channel comprising at least two adjacent channel segments, the two adjacent channel segments each being defined at least by a floor and one sidewall or two sidewalls extending upward from the floor to an upper surface of a land extending between the sidewalls of the two adjacent channel segments, and a low contact resistance material selectively deposited over portions of the upper surface of the land, leaving portions of the upper surface of the land uncovered by the low contact resistance material wherein substantially none of the low contact resistance material is deposited in the at least one channel.

17. A product as set forth in claim 16 further comprising a low contact resistance material selectively deposited in the at least one channel leaving portions of the at least one channel uncovered by the low contact resistance material.

18. A product as set forth in claim 16 wherein the low contact resistance material comprises gold.

19. A product as set forth in claim 18 further comprising a catalyst layer overlying the gas diffusion media layer, and a proton conductive membrane overlying the catalyst layer.

20. A product as set forth in claim 16 further comprising a diffusion media layer overlying the bipolar plate and in contact with the low contact resistance material, and wherein the diffusion media layer is constructed and arranged to diffuse fuel cell reactant gasses flowing into the diffusion media layer from the reactant gas flow field defined in the bipolar plate.

21. A method comprising:
providing a bipolar plate for a fuel cell including a reactant gas flow field defined therein by a plurality of lands and at least one channel, and selectively depositing a low contact resistance material over select portions of the lands, leaving portions of the lands-uncovered by the low contact resistance material, wherein the selectively depositing is conducted so that select portions of the at least one channel is covered with the low contact material leaving portions of the at least one channel uncovered by the low contact resistance material wherein the openings are discrete openings each being aligned substantially only with a land.

22. A method as set forth in claim 21 wherein the openings are discrete openings each being aligned substantially only with a land.

23. A method as set forth in claim 22 wherein the selectively depositing is conducted so that substantially no low contact resistance material is deposited in the at least one channel.

24. A method as set forth in claim 21 wherein the low contact resistance material comprises gold.

25. A method comprising:
providing a bipolar plate for a fuel cell including a reactant gas flow field defined therein by a plurality of lands and at least one channel comprising at least two adjacent channel segments, the two adjacent channel segments each being defined at least by a floor and one sidewall or two sidewalls extending upward from the floor to an upper surface of a land extending between the sidewalls of the two adjacent channel segments, and selectively depositing a low contact resistance material over select portions of the upper surface of the land, leaving a plurality of portions of the upper surface of the land uncovered by the low contact resistance material wherein the low contact resistance material is deposited substantially only on the lands, and the hydrophilic coating is deposited substantially only in the at least one channel, further comprising depositing a hydrophilic coating into the at least one channel.

* * * * *